No. 621,071. Patented Mar. 14, 1899.
C. A. GRANNELL.
MORTAR OR GROUT MIXING MACHINE.
(Application filed Feb. 2, 1898.)
(No Model.)
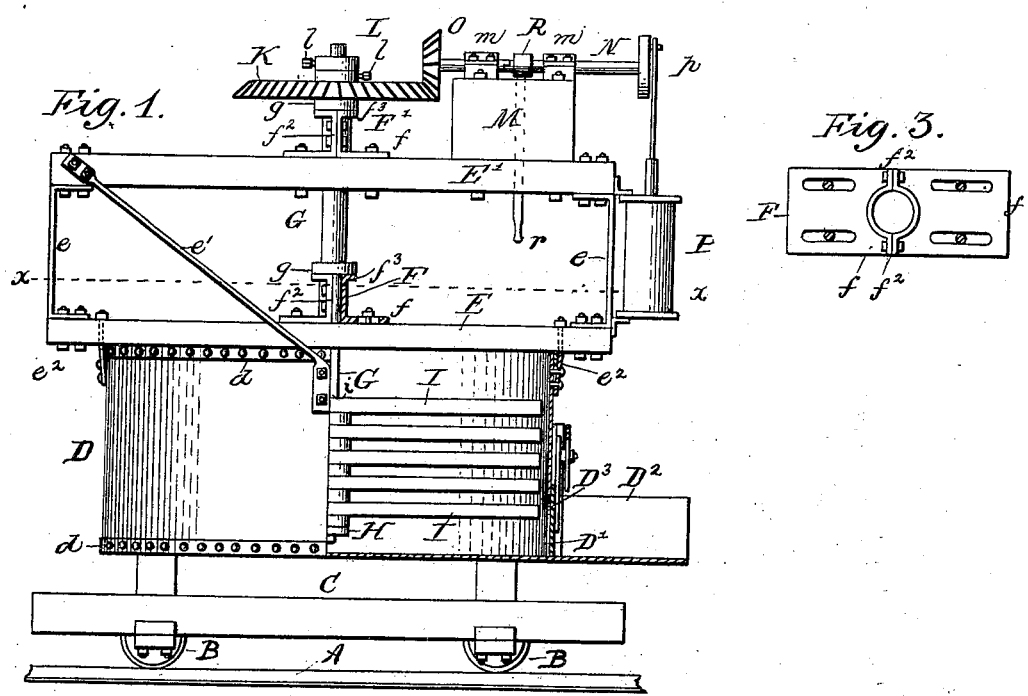
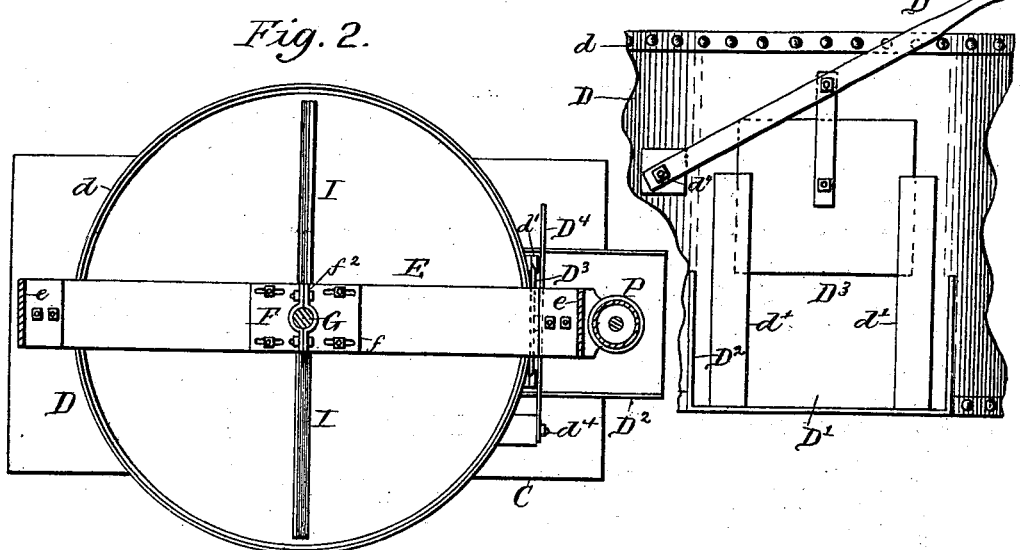
Witnesses
Thos. G. Homiller
L. S. Anderson
Inventor
Charles A. Grannell
by Connolly Bros.
Attorneys.

UNITED STATES PATENT OFFICE.

CHARLES A. GRANNELL, OF SMITHFIELD, PENNSYLVANIA.

MORTAR OR GROUT MIXING MACHINE.

SPECIFICATION forming part of Letters Patent No. 621,071, dated March 14, 1899.

Application filed February 2, 1898. Serial No. 668,867. (No model.)

*To all whom it may concern:*

Be it known that I, CHARLES A. GRANNELL, a citizen of the United States, residing at Smithfield, in the county of Fayette and State of Pennsylvania, have invented certain new and useful Improvements in Mortar or Grout Mixing Machines; and I do hereby declare the following to be a full, clear, and exact description of the invention, such as will enable others skilled in the art to which it appertains to make and use the same.

My invention has relation to mortar or grout mixing machines, and has for its object the provision of novel means for rapidly and thoroughly mixing mortar, grout, or similar substances on a large scale.

My invention consists in the novel construction, combination, and arrangement of parts hereinafter described.

Referring to the accompanying drawings, Figure 1 is a side elevation, partly in section, of my improved mortar or grout mixing machine. Fig. 2 is a horizontal sectional view on the line $x\,x$ of Fig. 1, and Figs. 3, 4, and 5 detail views of separate parts of the same.

In carrying my invention into effect I preferably mount a mortar or grout mixing machine upon a truck which is provided with wheels adapted to run upon a track, and in the drawings A designates a track upon which run wheels B B, that support a strong truck C. The entire mortar-mixing machine is mounted upon the truck C, so that the machine may be moved from point to point on the track A as desired. Upon the truck is mounted a tank D, composed of strong steel or iron plates firmly riveted together and having at its top and bottom edges reinforced bands or strips $d\,d$. An opening D' is provided at one side of the tank and a trough D² leads from the opening to a point beyond the end or side of the truck C. Vertical cleats $d'\,d'$ are bolted to the tank on each side of the opening D', and a straight door D³ is arranged to slide between the cleats $d'\,d'$. The door D³ is raised and lowered by means of a lever D⁴, that is pivoted at $d^4$ to the side of the tank D.

Upon the top of the tank D is arranged a heavy framework comprising the horizontal timbers or beams E E', which are secured together by angle-irons $e\,e$ and brace-rods $e'$, the lower timber being attached to the tank D by straps $e^2\,e^2$. Upon the top of each of the timbers E E' are arranged journal boxes or bearings F F', one of which is shown in the detail view Fig. 3. This journal box or bearing is composed of two half-sections, being divided on a vertical line, and each section comprises a wide base-plate $f$, which rests upon the timber and has longitudinal slots, through which bolts are passed to secure the box firmly in position, the slots allowing the boxes to be adjusted to take up wear. The two half-sections of the box are provided with flanges $f^2\,f^2$, through which bolts pass that serve to secure the half-sections together. Each box is formed with a flange $f^3$ on its upper end, and a vertical shaft G, which passes through both boxes, is formed with collars $g\,g'$, that rest upon the flanges $f^3$ of the boxes F F' and serve to support the shaft, while permitting it to turn freely in the boxes or bearings. The shaft G is of diminished diameter from the collar $g$ to its lower end and extends down into and near to the bottom of the tank D, the lower end of the shaft being screw-threaded to receive a nut or bur H. The series of arms I I are fixed upon the shaft G within the tank D, that portion of the shaft within the tank being squared and each of the arms I being formed with a wide collar or hub having a square hole, through which the shaft G passes. One of these arms is shown in plan and end view, Fig. 4, and it will be observed that the arms are beveled upwardly from one edge, the direction of motion of the shaft being such that a beveled edge presses against the mortar or grout as the shaft revolves, so that the mortar or grout will ride up the beveled surface of the arm, and thus be constantly raised up and over each arm, so that any tendency of the mortar or grout to pack in the bottom of the tank will be avoided. The bur or nut H serves to secure all the arms in position upon the shaft as the uppermost arm of the set bears against a shoulder $i$ upon the shaft G, this construction permitting the removal of any or all of the arms if they should become broken or worn from service.

Above the upper box or bearing F' a gear-wheel K is fixed upon the shaft G, and heavy washers L L are placed upon the shaft above the gear-wheel and fixed thereon by set-screws $l\ l$.

Upon the upper timber E′, to one side of the shaft, a block M is secured, and upon the block M are arranged boxes $m\ m$, that form bearings for a horizontal shaft N, which has fixed upon its inner end a beveled gear-wheel O, that meshes with the gear-wheel upon the shaft G. On the outer end of the horizontal shaft N a pulley-wheel may be secured, to which motion can be communicated by a band from a stationary engine; but I prefer to impart motion directly to the horizontal shaft by means of a steam-cylinder P, having its crank-arm connected directly to a crank $p$ on the shaft N. The horizontal shaft N is divided between the boxes $m\ m$, and a clutch R, which is operated by a lever $r$, is provided for the purpose of connecting the two parts of the shaft together, so that the machine may be started and stopped without starting or stopping the engine from which it receives motion. As before stated, the tank D is circular in cross-section, and the arms extend to within a very short distance of the sides of the tank, so that there will be no chance for mortar or grout to accumulate and harden between the sides of the tank and the ends of the arms at any point in the tank. The shaft G, it is to be noted, does not extend quite to the bottom of the tank, the boxes F F′ serving as the sole support of the vertical shaft, this construction obviating the difficulty which would be encountered if the shaft was journaled on the bottom of the tank, as a journal-bearing located at such a position would inevitably be destroyed by the grinding action of the sand within a very short time, whereas in my device the bearings being located wholly above the tank which contains the sand will not be subjected to contact with the sand in the tank, and as a measure of precaution the entire working parts above the lower timber F may be inclosed in suitable covering of boards or metal, or the boxes or bearings F F′ may be separately boxed or inclosed, if desired.

Having described my invention, I claim—

1. In a mortar or grout mixing machine, the combination of a movable truck mounted on wheels, a cylindrical tank mounted on said truck and having an opening in its side, with a gate to close the same, a framework above the tank comprising the horizontal timbers E, E′, connected together and to the sides of the tank, journal-bearings F, F′ attached to the upper sides of the timbers E, E′, a vertical shaft G having collars $g, g$, which rest on said bearings and support the shaft out of contact with the bottom of the tank, radial arms I, mounted on said shaft, within the tank, and mechanism for imparting rotary motion to the shaft, comprising an engine mounted on the frame E, E′, a horizontal shaft N mounted in suitable bearings on said frame and beveled gears O, K, attached to the shafts N and G respectively, as shown and described.

2. In a mortar or grout mixing machine, the combination of a movable truck mounted on wheels, a cylindrical metallic tank mounted on said truck and having an opening in its side with a gate to close the same, a framework above the tank consisting of the horizontal timbers E, E′, connected by angle-irons $e, e$, straps $e^2, e^2$ secured to the timber E and to the sides of the tank, two-part adjustable journal-boxes F, F′ attached to the upper sides of the timbers E, E′ a vertical shaft G having collars $g, g$, which rest on said boxes and support the shaft out of contact with the bottom of the tank, radial arms I mounted on said shaft, within the tank, and having wide collars or hubs which separate the arms, a nut secured to the bottom of the shaft to support the arms, and permit of their removal and replacement, and mechanism for imparting rotary motion to the shaft, substantially as described.

In testimony whereof I have affixed my signature in presence of two witnesses.

CHARLES A. GRANNELL.

Witnesses:
A. J. STEWART,
W. C. SACKETT.